United States Patent Office 3,023,100
Patented Feb. 27, 1962

3,023,100
LIGHT-SENSITIVE COMPOUNDS AND THEIR USE IN THE REPRODUCTION TECHNIQUE
Wilhelm Thoma, Leichlingen, and Otto Bayer and Heinrich Rinke, Leverkusen, Germany, assignors to Farbenfabriken Bayer Aktiengesellschaft, Leverkusen, Germany, a corporation of Germany
No Drawing. Filed Jan. 14, 1958, Ser. No. 708,745
Claims priority, application Germany Jan. 21, 1957
7 Claims. (Cl. 96—35)

This invention relates to a new class of light-sensitive compounds and methods to their use in the reproduction technique. More particularly the invention is concerned with light-sensitive compounds being soluble polycondensation products predominantly linked through amide bonds and having —C=C—CO— groups bonded to aromatic nuclei.

It is a primary object of the present invetion to provide new light-sensitive compounds which can find various commercial applications. Another object of the invention is to provide new light-sensitive compounds which can be prepared from inexpensive chemicals. A further object of the invention is to provide novel organic compounds which are soluble in an organic solvent but upon exposure to light undergo chemical reaction and become cross-linked and insoluble in said solvent. A further object of the invention is to provide a new reproduction technique using these light-sensitive compounds. Still further objects will appear hereinafter.

It has been found that soluble polycondensation products containing predominantly amide bonds and comprising —C=C—CO— groups bonded to aromatic nuclei, are cross-linked under the action of light and become insoluble. This fact allows the use of these soluble polycondensation products in the reproduction technique by exposing them to the action of light and afterwards dissolving out those parts of the polycondensation product not exposed and which, therefore, have not become insoluble. The polycondensation products to be used according to the invention can also contain ester, ether, urea, urethane, secondary amino and thioether groups as linking elements, in addition to the amide groups.

The production of such a soluble polycondensation product with —C=C—CO— groups bonded aromatic nuclei is carried out by using conventional processes known for the formation of amides. Thus, for instance, a mixture of polyvalent amines and polyvalent acids may be heated while the water formed during the condensation distills off. Condensation may be carried out in vacuo. Another process makes use of entrainers in which case water is removed by azeotropic distillation. When using methyl esters or ethylalkyl esters instead of the free acids an aminolysis reaction may be carried out instead of the condensation of the free monomeric starting materials. On the other hand polyamide forming derivatives of polyvalent amines can be reacted with polyvalent acids and, vice versa, polyvalent amines may be reacted with polyvalent acid chlorides. Besides acids and amines it is possible to concurrently use amino acids, amino alcohols, hydroxy acids and lactames. It is of course possible to use dehydrating agents as catalysts such as p-toluene sulfonic acid, potassium acetate or heavy metal salts.

Any polyvalent amine can be used with any polycarboxylic acid in the preparation of polyamides. Instead of the free acids their anhydrides, lower alkyl esters or chlorides can be employed. It is within the scope of the present invention to use polycondensation products containing ester groups as linking layers in addition to the amido groups in which case a polyester amide is involved. This object can be achieved by the concurrent use of amino alcohols, glycols, or hydroxy acids during the esterification procedure.

Examples of suitable polyvalent amines are ethylene diamine, propylene diamine-1,3, butylene diamine-1,4, pentamethylenediamine, hexamethylene diamine, pentamethyl diethylene triamine, hexamethyl triethylene tetramine, 4',4'-diamine dicyclo hexyl methane, diamino propylether, γ,γ'-diamino propylglycolether and other diamino propyldiethers obtained by addition of acrylonitril to polyethylene glycols and subsequent hydrogenation or obtained from 2 mols of acrylonitrile to polytetrahydrofuran or to hydroxyl groups containing thioethers.

Examples of suitable polycarboxylic acids, their anhydrides, esters, chlorides or other amide forming derivatives are for instance carbonic acid, oxalic acid, malonic acid, succinic acid, adipic acid, phthalic acid, isophthalic acid, terephthalic acid, maleic acid and citric acid. Examples of suitable amino acids are ε-amino caproic acid, amino butyric acid, amino propionic acid, di- and ω-amino undecane carboxylic acid. As lactams may be mentioned ε-caprolactam and butyro lactam.

Suitable compounds with hydroxy groups which may be concurrently used are polyhydric alcohols such as ethylene glycol, diethylene glycol, triethylene glycol, propylene glycol, butylene glycol, hexamethylene glycol, thiodiglycol, oxyalkylated thiodiglycol, trimethylolpropane, pentaerythriotol, sorbitol, mannitol. In addition may be mentioned ethanol amine, propanol amine, butanol amine, N-methyl ethanol amine, hydroxy butyric acid, ε-hydroxycaproic acid, tartaric acid and ω-hydroxy undecane carboxylic acid.

Care must be taken during the condensation process that —C=C—CO— groups linked to aromatic nuclei are concurrently incorporated into the polycondensation product. For this purpose either cinnamic acid or its derivatives or suitable chalcone compounds are concurrently employed.

Suitable cinnamic acid derivatives apart from cinnamic acid itself, are, for example, compounds of the following general formula:

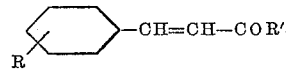

wherein R represents one or more alkyl, aryl, aralkyl, alkoxy, nitro, amino, carboxyl groups or halogen or hydrogen atoms. R' can be, for instance, an OH group thus representing a free acid, a halogen atom thus representing an acid halide, a hydrocarbon radical thus representing a cinnamic acid ester, or a $NH_2$ group which may be substituted or unsubstituted, the formula thus representing a cinnamic acid amide.

It can be seen from this formula that it is also possible to use those cinnamic acid derivatives which contain in the molecule other functional groups which can be condensed.

For the present process it is advantageous to use cinnamic acid derivatives which are bifunctional or polyfunctional, whereby it is possible for particularly high concentrations of photo-active —C=C—CO— groups bonded to aromatic nuclei to be incorporated into the polycondensation product.

Among the large number of compounds which can be used as cinnamic acid derivatives in the manufacture of the polycondensation product of the invention there are, for example, cinnamic acid, cinnamic acid methylester and the higher cinnamic acid alkylesters, cinnamic acid chloride, cinnamic acid amide, cinnamic acid dimethylamide, cinnamic acid ethanolamide, 3- and 4-nitrocinnamic acid, its esters, chlorides and amides, 3- and 4-aminocinnamic acid, 3- and 4-alkoxy cinnamic acid and the various cinnamic acids substituted by alkyl groups in the aromatic nucleus, 3,3'-azo-cinnamic acid. Further examples are 3- and 4-carboxy cinnamic acid, 3- and 4-hydroxy cinnamic acid, 4,4'-phenylene diacrylic acid and the bis-glycol esters thereof, the condensation product of cyanuric chloride and 3 mols of 3-aminocinnamic acid, the condensation product of epichlorhydrin and 3-hydroxy cinnamic acid ester, 3-dihydroxy ethylamino cinnamic acid ester and also the condensation product of 2,4-dimethyl cinnamic acid ester and formaldehyde. It is also possible to employ as cinnamic acid derivative with cinnamic acid partially esterified polyvalent alcohols such as the pentaerythritol dicinnamic acid ester. Further bifunctional cinnamic acid derivatives are compounds of the following formula:

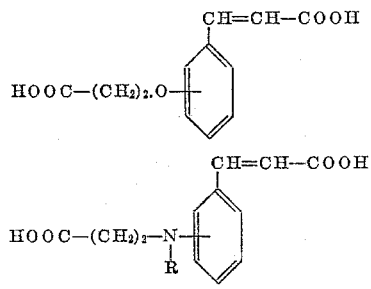

R=alkyl, aryl, aralkyl.

Chalcone compounds which are suitable for the present process are for instance those of the following formulae:

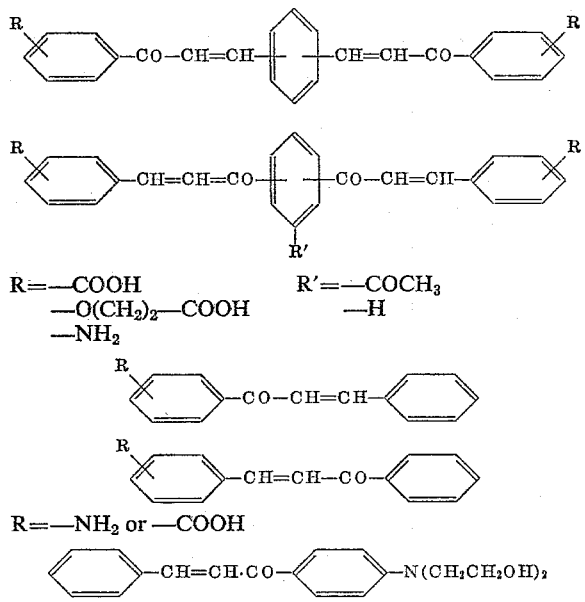

R=—COOH     R'=—COCH$_3$
—O(CH$_2$)$_2$—COOH     —H
—NH$_2$

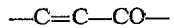

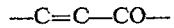

R=—NH$_2$ or —COOH

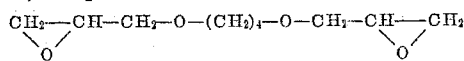

The condensation product should have a minimum molecular weight of about 750. It is preferred to use in the reproduction technique polycondensation products with a molecular weight of 2,000 and more. The polycondensation product should contain 1–25 parts of

—C=C—CO— groups per 100 parts of polycondensation product. The best results are obtained when 20–25 parts of

—C=C—CO— groups are present for each 100 parts of polycondensation product.

In order to obtain soluble products with a higher molecular weight it is possible to modify the polyamides obtained according to the present process by reacting the terminal amino and/or carboxyl groups with diisocyanates such as toluylene diisocyanate or hexamethylene diisocyanate. Chain lengthening of the polyamide can also be achieved by reacting the polyamides with diepoxides, for instance, the epoxide of the formula

or by reacting with epichlorohydrine.

When the soluble polycondensation products predominantly linked through amide bonds and having

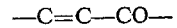

groups bonded to aromatic nuclei are exposed to actinic light their physical and chemical properties are changed more or less rapidly by polymerization or dimerisation of the double bonds of the cinnamic acid or chalcone derivative. A wide range of different light sources can be used, depending on the structure of the light-sensitive high polymer substance. Light with strong proportions of ultra-violet rays is particularly effective. The speed of the cross-linking caused by light irradiation can be further increased by adding sensitizers. As sensitizers, it is possible with particular advantage to use compounds from the class comprising cyanines, triphenyl methane dyestuffs, and dyestuffs of the benzanthrone, quinone or anthraquinone series. These dyestuffs sensitise the reaction products, particularly with respect to visible light. The degree of cross-linking depends on the strength of the exposure and the amount of the cinnamic acid derivative in the polymer, and can consequently easily be varied. In particular, the condensation products with

—C=C—CO— groups bonded to aromatic nuclei can be dissolved in organic solvents, whereupon films can be cast or filaments can be drawn from the solution with evaporation of the solvent. Due to the cross-linking initiated by the action of light, the substances become insoluble, harder and more insensitive to acids, alkali and solvents. The substances which are prepared by the process according to the invention and which can be cross-linked by the action of light can be used, for example, as coatings, foils and the like. It is also possible to produce molded elements, the surface of which can be improved by subsequent exposure. With particular advantage, the compounds according to the invention can be used as auxiliaries in the reproduction art, since the action of light causes the layers of high molecular weight to cross-link at the places affected by the light, while those places which are not affected by the light remain unchanged. By after-treatment with a suitable solvent, the unexposed parts can then be dissolved out, so that layers graduated according to the picture are obtained with very sharp contours.

The invention is further illustrated by the following examples. All parts given are by weight.

*Example 1*

4.92 parts of 1,4-phenylene-bis-acrylic acid dimethylester (0.020 mol) and 3.60 parts of γ,γ'-diamino propyl glycolether (0.0204 mol) are thoroughly mixed and heated to 170 to 180° C. for 2.5 hours in an atmosphere of nitrogen. The yellowish brown brittle resin is soluble in for instance dimethyl formamide, glycol monomethylether acetate or cyclohexanone. Its relative viscosity is 1.30 in a 1% m-cresol solution; K-value 33.6.

Photosensitive films are cast onto aluminium foils from a 50% dimethyl formamide solution. Those parts of the film which are exposed to the light of a quartz lamp or to X-rays become insoluble after 2 to 4 minutes (in case of ultraviolet light) or after 8 minutes (in case of X-rays). The unexposed parts of the film can be dissolved in dimethyl formamide. The film is then brushed with a solution of gum arabic. The residual undissolved parts of the film are now retaining printing colours.

*Example 2*

4.40 parts of cinnamic acid-p-carboxyl acid dimethylester (0.02 mol) and 2.70 parts of γ,γ'-diamino propylether (0.0204 mol) are heated while stirring to a temperature of 170 to 180° C. for 4 hours in an atmosphere of nitrogen.

The reaction product has a melting point of 100 to

105° C. The relative viscosity (see Example 1) is 1.19; K-value 26.

Films are cast on aluminium foils from a 4% dimethyl formamide solution. The films are cross-linked by exposure to ultra violet light for 2 to 8 minutes. They become insoluble in dimethyl formamide.

*Example 3*

0.98 part of 1,4-phenylene-bis-acrylic acid dimethylester (0.04 mol), 3.52 parts of cinnamic acid p-carboxylic acid dimethylester (0.016 mol) are reacted together with 3.58 parts of $\gamma,\gamma'$-diamino propyl glycolether (0.0204 mol) by heating to 170 to 180° C. for 4 hours in an atmosphere of nitrogen.

The reaction product melts at 95 to 97° C. Its relative viscosity (see Example 1) is 1.21; K-value 28.

Films are cast onto metal or glass supports from a 4% dimethyl formamide solution of the photosensitive resin. The films quickly become insoluble upon exposure to a carbon filament lamp or to ultra violet light within 2 to 8 minutes and can be used for reproduction purposes.

*Example 4*

0.98 part of 1,4-phenylene-bis-acrylic acid dimethylester (0.04 mol), 3.52 parts of cinnamic acid p-carboxylic acid dimethylester (0.016 mol) are reacted with 4.28 parts of 4,4'-diamino dicyclo hexyl methane (0.0204 mol) by heating to 175 to 180° C. for 4 hours. While stirring in an atmosphere of nitrogen heating is continued for half an hour at 200° C.

The reaction product melts at 185 to 195° C. Its relative viscosity (see Example 1) is $1.38 \cdot 10^{-3}$; K-value 38.

From a 4% dimethyl formamide solution of the polyamide it is possible to draw films which quickly become insoluble upon exposure to ultra violet light and can be used for reproduction purposes.

*Example 5*

4.92 parts of 1,4-phenylene diacrylic acid dimethylester (0.02 mol) and 4.28 parts of 4,4'-diamino dicyclo hexyl methane (0.0204 mol) are heated to 170 to 175° C. in an atmosphere of nitrogen. After 1.5 hours the melt solidifies to give a brittle resin easily soluble in dimethyl formamide.

The resin melts at 250° C. Its relative viscosity (see Example 1) is 1.44; K-value 40.8.

From a 4% solution of the polyamide in dimethyl formamide it is possible to draw films which quickly become insoluble upon exposure to a quartz lamp within 8 minutes and can be used for reproduction purposes.

*Example 6*

2.95 parts of 1,4-phenylene-bis-acrylic acid dimethylester (0.012 mol), 1.39 parts of adipic acid dimethylester (0.008 mol) and 3.58 parts of $\gamma,\gamma'$-diaminopropyl glycolether (0.0204 mol) are heated to 170 to 180° C. while stirring for 4 hours in an atmosphere of nitrogen. The reaction product thus obtained melts at about 140 to 142° C. Its relative viscosity (see Example 1) is 1.16; K-value 23.6.

Films can be cast from a 4% dimethyl formamide solution of the reaction product. The film can be readily cross-linked by exposure to the light of a quartz lamp within 2 minutes. It can be readily used for reproduction purposes as a printing matrix.

*Example 7*

8.24 parts of chalcone-4,4'-bis-hydroxy acetic acid ethyl ether are reacted with 2.65 parts of $\gamma,\gamma'$-diaminopropyl ether in an atmosphere of nitrogen while heating for 30 minutes to 175° C. Heating is continued for 30 minutes at the same temperature. A reddish-brown resin is obtained which is soluble in m-cresol and dimethyl formamide. K-value 26.5.

Films are cast onto metal or glass supports from a 5% dimethyl formamide solution of the photosensitive resin. The films quickly become insoluble upon exposure to a quartz lamp. The unexposed parts of the film can be readily dissolved in dimethyl formamide and removed thereby.

The starting material is produced as follows: 4–6 parts of sodium metal are dissolved in 100 parts of ethanol and mixed with a 50% solution in ethanol of 24 parts of 4,4'-dihydroxy chalcone. 25 parts of chloroacetic acid ethyl ester are dropped into the reaction mixture which is then heated under reflux for 6 hours. Sodium chloride which has been precipitated is filtered off. From the filtrate the chalcone-4,4'-bis-hydroxy acetic acid ester crystallizes out. M.P. 116° C.

*Example 8*

8.24 parts of chalcone 4,4'-bis-hydroxy acetic acid ethyl ester prepared according to Example 7 are reacted with 3.60 parts of $\gamma,\gamma'$-diaminopropyl glycolether by heating to 175° C. for half an hour in an atmosphere of carbondioxide. Heating is continued for 20 minutes at the same temperature. A brown resin is obtained which is soluble in m-cresol, dimethyl formamide, pyridine, dioxane and cyclohexanone.

Films are cast on aluminium foils from a 10% solution of the resin in the above solvents. The films are cross-linked by exposure to ultra violet light and become insoluble in the above solvents.

What is claimed is:

1. A soluble polyamide of a dicarboxylic acid and a diamine, said polyamide having as repeating integral units in the main polymer chain the grouping —CH=CHCO— attached through the —CH=CH— end to an aromatic nucleus and through the —CO— end to a member selected from the group selected from aromatic nuclei and amido nitrogen, said aromatic nucleus and said member both being repeating integral portions in the main polymer chain.

2. A method of reproducing the image of an object which comprises coating a support with a product as defined in claim 1 to thereby obtain a photo-sensitive surface, exposing said surface to a light source located behind said object and treating the exposed surface with a developer dissolving the unchanged portions of said product to thereby produce a negative representing said object.

3. A soluble polyamide of claim 1 having a molecular weight of at least 750, the —C=C—CO— groups representing 20 to 25% by weight of the poly condensation product.

4. A reproduction method which comprises exposing to the action of actinic light a soluble polyamide of claim 1.

5. The reproduction method of claim 4 wherein the soluble polyamide has a molecular weight of at least 750.

6. The reproduction method of claim 5 wherein the —C=C—CO— groups represent 1 to 25% by weight of the soluble polyamide.

7. The process of claim 5 wherein the —C=C—CO— groups represent 20 to 25% by weight of the soluble polyamide.

References Cited in the file of this patent

UNITED STATES PATENTS 2,811,509    Smith et al. _____ Oct. 29, 1957